United States Patent
Bremmer et al.

(10) Patent No.: US 7,698,939 B2
(45) Date of Patent: Apr. 20, 2010

(54) THERMISTOR-BASED FUEL SENSOR

(75) Inventors: Lavern M. Bremmer, Dexter, MI (US);
Michael R. Teets, Grosse Pointe Park, MI (US); Trevor L. Enge, West Bloomfield, MI (US); Greg Schoenberg, St. Louis, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 286 days.

(21) Appl. No.: 11/743,779

(22) Filed: May 3, 2007
(Under 37 CFR 1.47)

(65) Prior Publication Data
US 2008/0083275 A1 Apr. 10, 2008

Related U.S. Application Data

(60) Provisional application No. 60/746,321, filed on May 3, 2006.

(51) Int. Cl.
*G01F 23/00* (2006.01)
(52) U.S. Cl. .................................................. 73/295
(58) Field of Classification Search ............... 73/295
See application file for complete search history.

(56) References Cited

U.S. PATENT DOCUMENTS

| | | | |
|---|---|---|---|
| 4,135,186 A | 1/1979 | Minorikawa et al. | |
| 4,319,233 A | 3/1982 | Matsuoka et al. | |
| 4,466,282 A * | 8/1984 | Kuhnel | 73/295 |
| 4,609,913 A | 9/1986 | Arbogast et al. | |
| 4,656,464 A | 4/1987 | Cliffgard | |
| 4,720,997 A * | 1/1988 | Doak et al. | 73/295 |
| 4,805,454 A | 2/1989 | LeVert | |
| 5,022,263 A * | 6/1991 | Uriu et al. | 73/295 |
| 5,092,170 A | 3/1992 | H0nstvet et al. | |
| 5,174,153 A | 12/1992 | Nakano | |
| 6,098,457 A | 8/2000 | Poole | |
| 6,568,263 B1 | 5/2003 | Snelling | |
| 6,662,650 B1 | 12/2003 | Durkee et al. | |
| 2004/0200277 A1* | 10/2004 | Feldstein et al. | 73/304 R |

* cited by examiner

*Primary Examiner*—Hezron Williams
*Assistant Examiner*—Nathaniel Kolb
(74) *Attorney, Agent, or Firm*—Ralph E. Smith

(57) ABSTRACT

A system for sensing a fuel level includes sensors that sense the fuel level and a voltage source that applies a constant voltage to the sensors for a predetermined time. The system includes a control module that measures outputs of the sensors at a beginning and at an end of the predetermined time. The control module determines a number of the sensors that are submersed in fuel or air based on the outputs and calculates the fuel level based on the number of the sensors that are submersed in fuel or air.

18 Claims, 4 Drawing Sheets

THERMISTOR-BASED FUEL SENSOR

CROSS-REFERENCE TO RELATED APPLICATION

The present non-provisional patent application claims the benefit of priority to U.S. Provisional Patent Application No. 60/746,321, filed May 3, 2006, and entitled "THERMISTOR-BASED FUEL SENSOR", which is incorporated in-full by reference herein.

FIELD OF THE INVENTION

The present invention relates to fuel systems, and more particularly to systems and methods for sensing fuel level in fuel tanks.

BACKGROUND OF THE INVENTION

Generally, mechanical devices called floats are used to measure fuel levels in fuel tanks. A float rides on an upper surface of fuel in a fuel tank. The float is typically connected to one end of a pivot arm. Another end of the pivot arm typically includes a wiper mechanism. The wiper mechanism brushes against a resistive strip when the pivot arm moves due to changes in fuel level. Resistance of the resistive strip changes when the wiper mechanism moves. Changes in resistance of the resistive strip represent changes in fuel level. Accordingly, changes in resistance can be displayed on a panel to indicate changes in fuel level in the fuel tank.

Mechanical parts used in conjunction with floats tend to degrade or breakdown over time due to wear and tear. Thus, floats may not accurately indicate fuel level. Instead, electronic sensors may be installed in the fuel tank to sense fuel level. Signals generated by electronic sensors can be analyzed to determine fuel level in the fuel tank. Electronic sensors tend to indicate fuel level more accurately and reliably than floats since electronic sensors do not have mechanical moving parts.

SUMMARY OF THE INVENTION

A system for sensing a fuel level includes sensors that sense the fuel level and a voltage source that applies a constant voltage to the sensors for a predetermined time. The system includes a control module that measures outputs of the sensors at a beginning and at an end of the predetermined time. The control module determines a number of the sensors that are submersed in fuel or air based on the outputs and calculates the fuel level based on the number of the sensors that are submersed in fuel or air.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Thermistors are resistors that change resistance in response to changes in temperature. Thus, thermistors can be used to measure changes in temperature. That is, changes in temperature can be measured by measuring changes in resistance of thermistors. For example, a linear change $\Delta T$ in temperature T may cause a substantially linear change $\Delta R$ in resistance R of a thermistor. In that case, using a first-order approximation, a relationship between $\Delta T$ and $\Delta R$ may be expressed as follows.

$$\Delta R = k * \Delta T$$

where k is a first-order temperature coefficient of resistance of the thermistor.

Thermistors can be of two types depending on an algebraic sign of k. For example, thermistors can have a positive temperature coefficient (PTC) if k is positive. Resistance of thermistors having PTC increases when temperature increases. On the other hand, thermistors can have a negative temperature coefficient (NTC) if k is negative. Resistance of thermistors having NTC decreases when temperature increases. Although the thermistors having PTC are used in this disclosure, thermistors having NTC may be used alternatively.

Figure 1A:
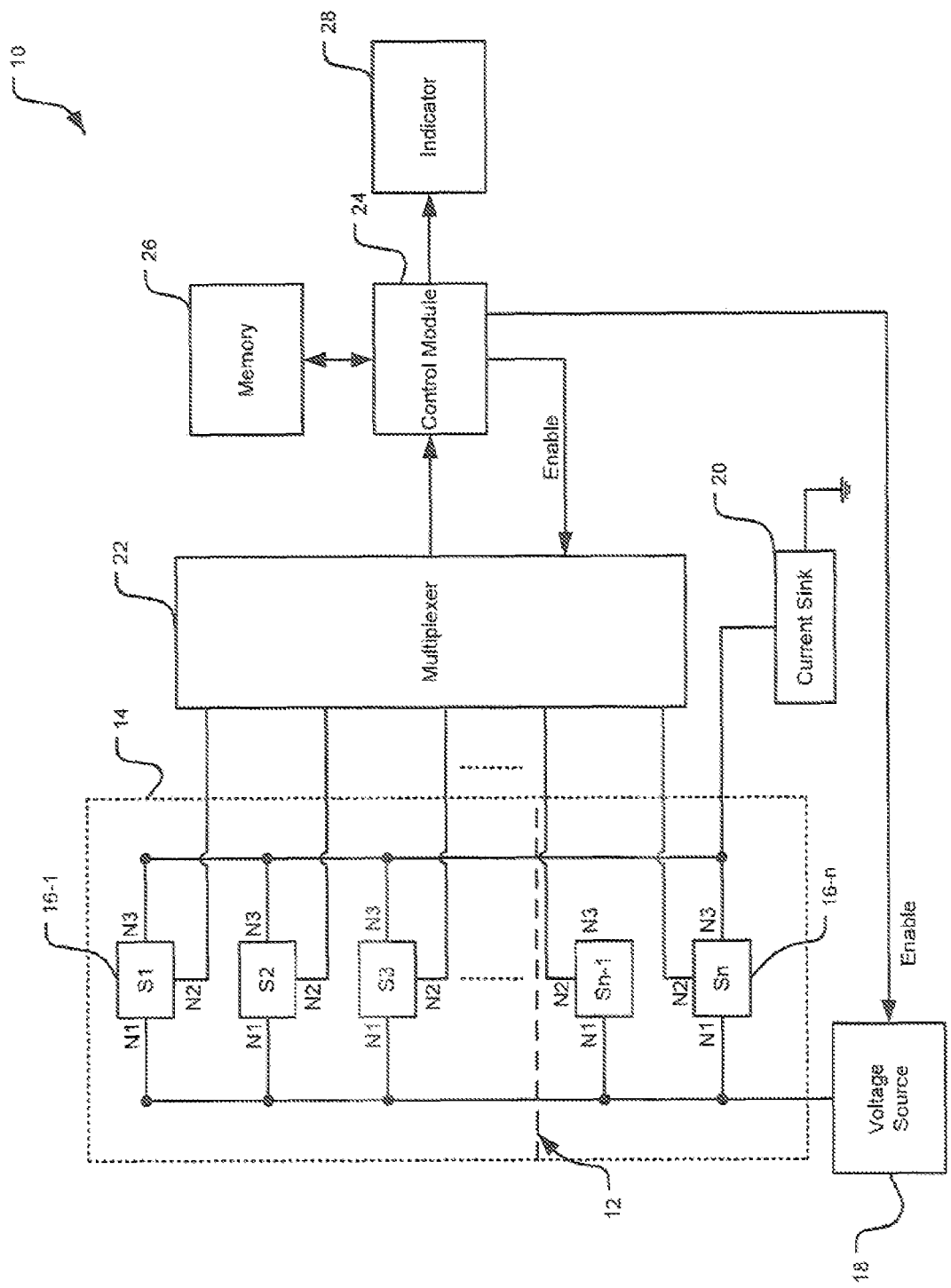
FIG. 1A is a block diagram of an exemplary system for sensing fuel level in a fuel tank according to the present invention.
Figure 1B:
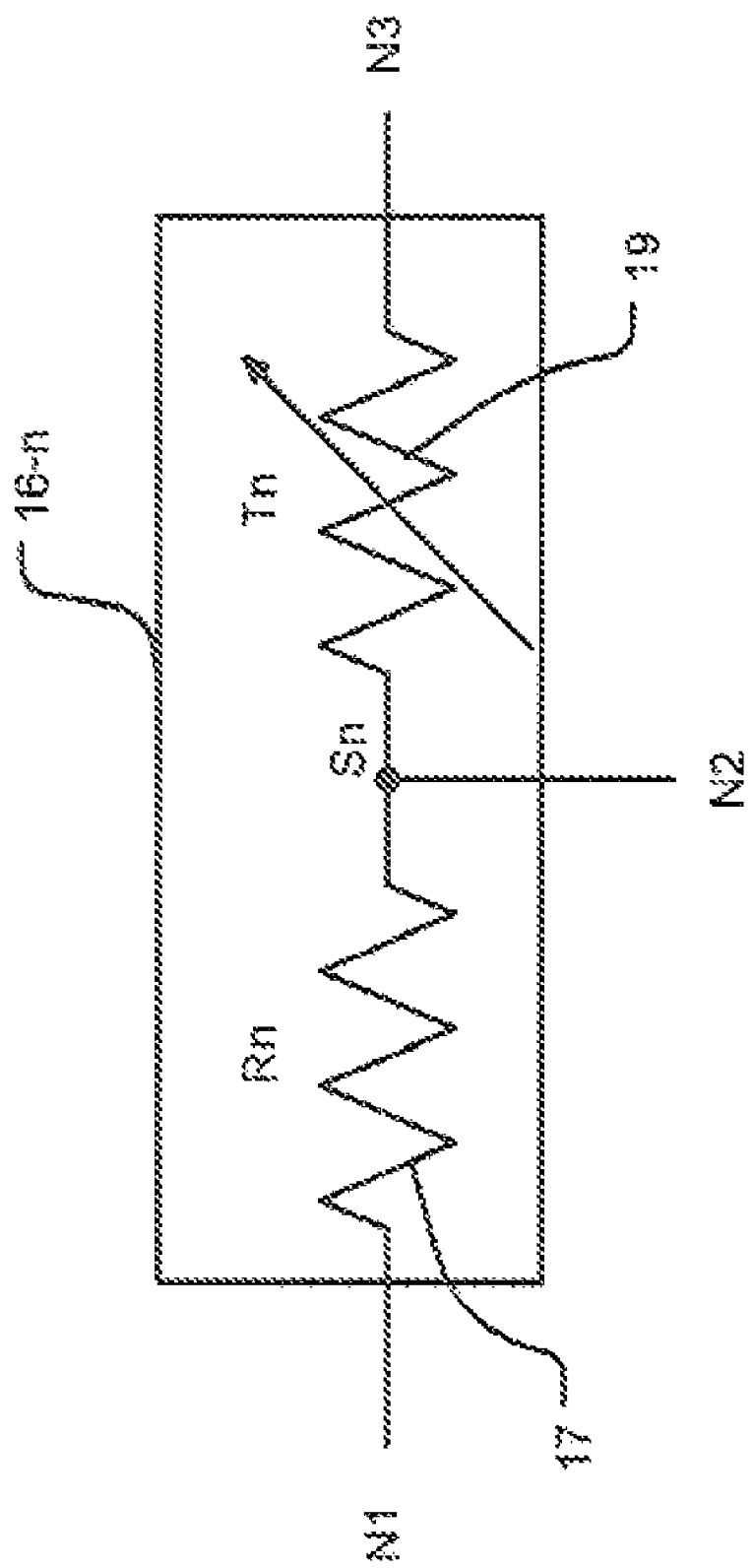
FIG. 1B is an electrical schematic of an exemplary sensor used in FIG. 1A.

Referring now to FIGS. 1A-1B a system 10 for sensing a fuel level 12 in a fuel tank 14 comprises thermistor-based sensors 16-1, 16-2, . . . 16-n (collectively sensors 16). The system 10 further comprises a constant voltage source 18, a current sink 20, a multiplexer 22, a control module 24, memory 26, and an indicator 28. Each one of the sensors 16 is installed one above another at a predetermined height in the fuel tank 14 to sense the fuel level 12. When the control module 24 enables the constant voltage source 18, the constant voltage source applies a constant voltage to nodes N1 of sensors 16. A current sink 20 sinks current from nodes N3 of sensors 16.

The control module 24 periodically enables the multiplexer 22 to scan nodes N2 of sensors 16. The multiplexer 22 communicates voltages at nodes N2 of sensors 16 to the control module 24. The control module 24 compares voltages at nodes N2 to thresholds stored in a look-up table in memory 26. The control module 24 determines which of the sensors 16 are submersed in fuel and which of the sensors 16 are not submersed in fuel. Accordingly, the control module 24 calculates the fuel level 12 based on the predetermined height of sensors 16 that are submersed in fuel. The indicator 28 indicates the fuel level 12.

As shown in FIG. 1B, sensor Sn comprises a fixed resistor 17 of resistance Rn that is connected in series to a thermistor 19 having a resistance Rt. The resistance Rt of the thermistor 19 varies with temperature. One end of the resistor 17 that communicates with the constant voltage source 18 is called node N1. Another end of the resistor 17 that communicates with the thermistor 19 is called node N2. A voltage at node N2 represents an output of the sensor Sn. The multiplexer 22 communicates the output of the sensor Sn to the control module 24. Another end of the thermistor 19 that communicates with the current sink 20 is called node N3. Thus, nodes N1, N2, and N3 of sensors 16 communicate with the constant voltage source 18, the multiplexer 22, and the current sink 20, respectively.

Initially, a constant voltage generated by the constant voltage source 18 is applied to the resistor 17 when the resistor 17 and the thermistor 19 are approximately at an ambient temperature Ta of their surrounding. The surrounding may or may not be fuel depending on whether the sensor Sn is submersed or not submersed in fuel. Accordingly, the ambient temperature of the sensor Sn may vary.

Current begins to flow through the resistor 17 and the thermistor 19. Immediately thereafter, before the current begins to heat the thermistor 19, a voltage V1 is measured at node N2. For example, V1 may be measured a few microseconds after the constant voltage is applied. The control module 24 activates the multiplexer 22. The multiplexer 22 scans the node N2 of the sensor Sn and communicates the voltage V1 at the node N2 to the control module 24. V1 represents the ambient temperature Ta of the sensor Sn.

V1 is used to reference a predetermined threshold voltage Vth from a look-up table for determining a temperature change caused by subsequent heating of the thermistor 19. Vth can b e predetermined based on the constant voltage generated by the constant voltage source 18, the resistance Rn, and electrical characteristics of the thermistor 19. Vth may be different for different ambient temperatures Ta. For example, Vth for the ambient temperature Ta when the sensor Sn is submersed in fuel may be different from Vth' for an ambient temperature Ta' when the sensor Sn is not submersed in fuel. A look-up table having different values of Vth for different values of Ta (or V1) is stored in memory 26.

The thermistor 19 heats due to the current flowing through the resistor 17 and the thermistor 19. Consequently, resistance Rt of the thermistor 19 changes. A change in resistance Rt, in turn, changes the current. After a predetermined time, such as 10 seconds, equilibrium is reached. The current and the temperature of the thermistor 19 stabilize. The thermistor 19 heats to a temperature that is greater than the ambient temperature Ta (or Ta').

A voltage V2 is measured at the node N2. The control module 24 activates the multiplexer 22. The multiplexer 22 scans the node N2 of the sensor Sn and communicates the voltage V2 at the node N2 to the control module 24. The control module 24 reads Vth from the lock-up table, wherein Vth corresponds to the ambient temperature Ta at which V1 is measured at node N2 of the sensor Sn. The control module 24 compares V2 to Vth.

Generally, fuel is a better conductor of heat than air or fuel vapor. Therefore, when a constant voltage is applied for a predetermined time to the sensor Sn, the sensor Sn will heat less when the sensor Sn is submersed in fuel than when the sensor Sn is not submersed in fuel. Consequently, resistance Rt of the thermistor 19 in the sensor Sn will change less when t he sensor Sn is submersed in fuel than when not submersed in fuel. As a result, voltage V2 at node N2 of the sensor Sn may be lower when the sensor Sn is submersed in fuel than when the sensor Sn is not submersed in fuel.

Thus, the system 10 determines that one or more of the sensors 16 is submersed in fuel if V2 for one or more of the sensors 16 is less than Vth. On the other hand, the system 10 determines that one or more of the sensors 16 is not submersed in fuel if V2 for one or more of the sensors 16 is greater than Vth.

Since the constant voltage source 18 applies constant voltage simultaneously to all sensors 16, the multiplexer 22 scans nodes N2 of all sensors 16 and communicates voltages V1 and V2 at nodes N2 of all sensors 16 to the control module 24. The control module 24 uses V1 to infer Ta of each one of the sensors 16. The control module 24 looks up Vth that corresponds to the Ta of each one of the sensors 16.

The control module 24 compares V2 of each one of the sensors 16 to respective Vth. The control module 24 determines whether each one of the sensors 16 is submersed or not submersed in fuel. Additionally, the control module 24 looks up in memory 26 the height at which each one of the sensors 16 is located in the fuel tank 14. The control module 24 calculates the fuel level 12 based on which of the sensors 16 are submersed in fuel and the height of the sensors that are submersed in fuel. The indicator 28 indicates the fuel level 12.

Figure 2:
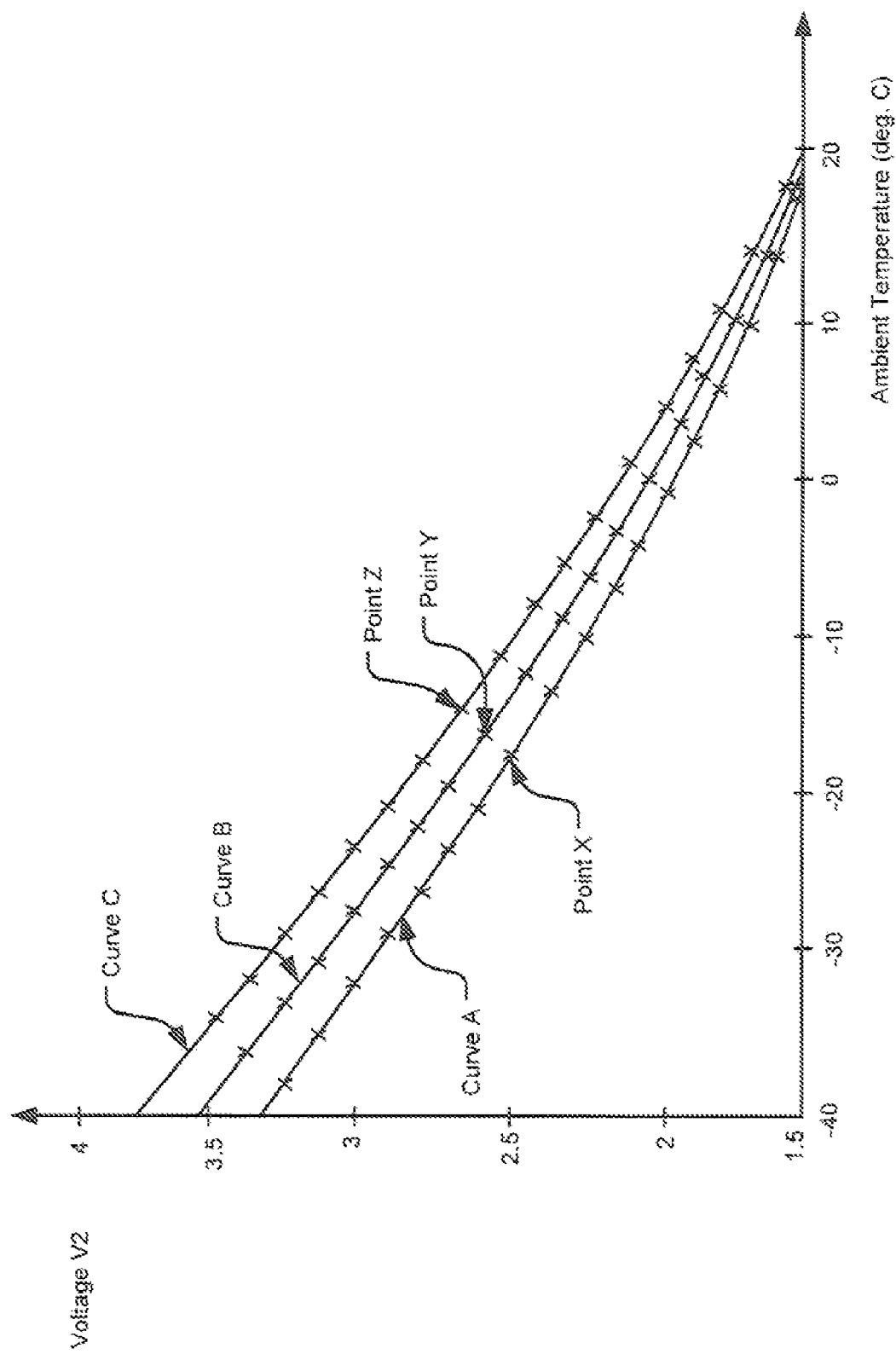
FIG. 2 is a graph of sensor output voltage relative to ambient temperature according to the present invention.

Referring now to FIG. 2, a look-up table in the form of a graph may be used to determine whether each one of the sensors 16 is submersed or not submersed in fuel. Curve A shows voltage V1 at nodes N2 of the sensors 16 at different ambient temperatures before a constant voltage is applied. Since a constant voltage is applied to sensors 16 and since sensors 16 heat for a predetermined time, voltage V2 for sensors 16 may be estimated when sensors 16 are submersed in fuel and when sensors 16 are not submersed in fuel. Curve B shows voltage V2 at nodes N2 of sensors 16 when sensors 16 are submersed in fuel. Curve C shows voltage V2 at nodes N2 of sensors 16 when sensors 16 are not submersed in fuel.

Specifically, V1 at nodes N2 of sensors 16 is measured when sensors 16 are at ambient temperature. V1 may vary depending on ambient temperature of sensors 16. Thus, V1 at nodes N2 o f sensors 16 that are submersed in fuel may be different from V1 at nodes N2 of sensors 16 that are not submersed in fuel. A point X, for example, is located on the graph using V1 for each one of the sensors 16.

Thereafter, sensors 16 are heated by applying a constant voltage. Thermistors 19 in each one of the sensors 16 heat to different temperatures depending on which of the sensors 16 is submersed or not submersed in fuel. Accordingly, V2 at nodes N2 of sensors 16 may vary.

V2 at nodes N2 of sensors 16 is measured and compared to values on curves B and C on the graph. If V2 for one of the sensors 16 matches a point Y on cure B, for example, then that sensor is submersed in fuel. If V2 for one of the sensors 16 matches a point Z on curve C, for example, then that sensor is not submersed in fuel. Having determined which of the sensors 16 is submersed and not submersed in fuel, the fuel level 12 is calculated based on the height at which the sensors 16 are installed in the fuel tank 14.

Figure 3:
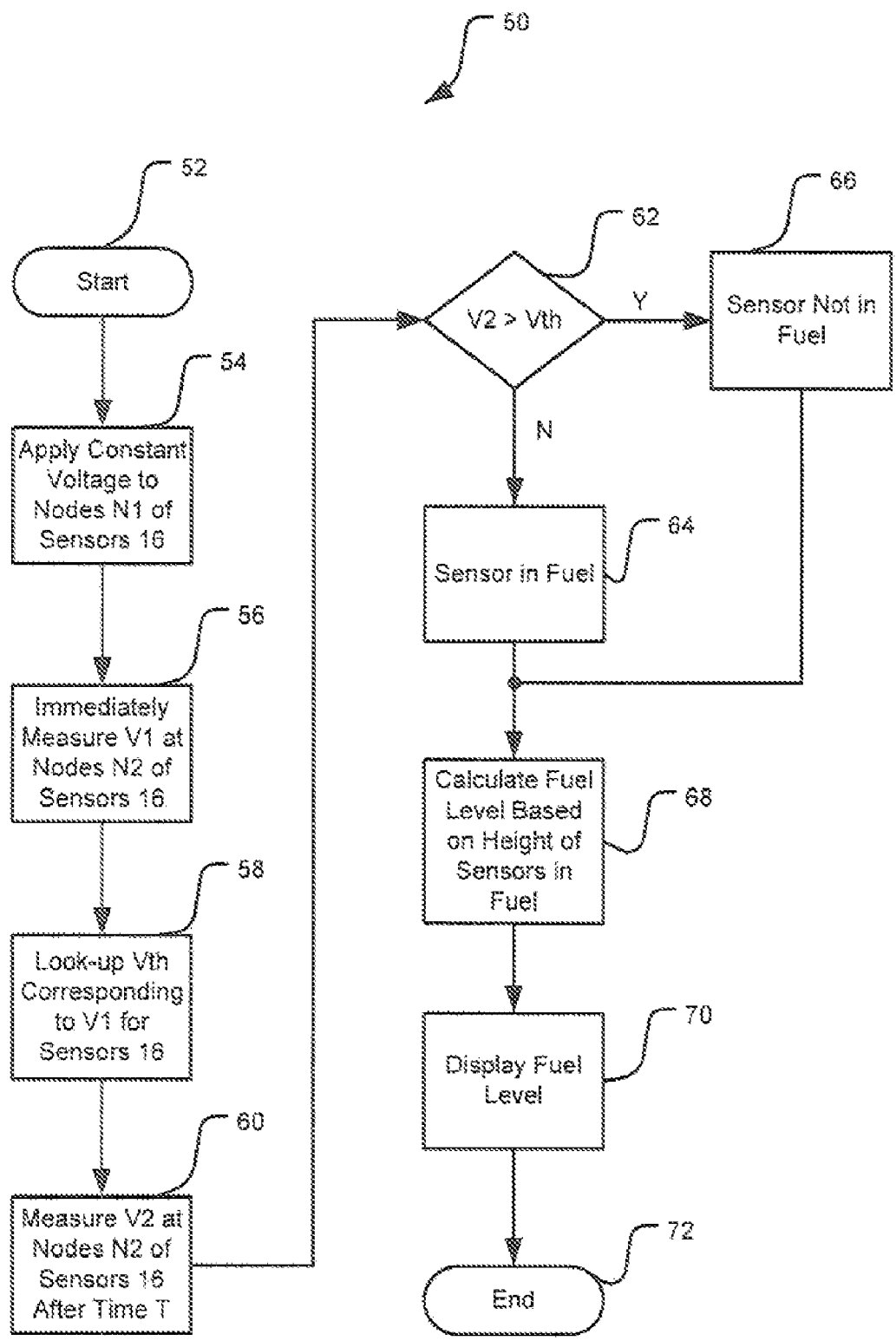
FIG. 3 is a flowchart of an exemplary method for sensing fuel level in a fuel according to the present invention.

Referring now to FIG. 3, a method 50 for determining a fuel level 12 in a fuel tank 14 begins at step 52. Thermistor sensors 16 are installed one above another in the fuel tank 14. A constant voltage source 18 applies a constant voltage to nodes N1 of sensors 16 in step 54 when enabled by a control module 24.

Immediately thereafter, voltage V1 is measured at nodes N2 of sensors 16 in step 56 while sensors 16 are at their ambient temperature. Ambient temperature varies depending on whether sensors 16 are submersed or not submersed in fuel. A multiplexer 22 periodically scans nodes N2 of sensors 16 when enabled by the control module 24. The multiplexer 22 communicates voltages at nodes N2 of sensors 16 to the control module 24. The control module 24 looks up in memory 26 threshold voltages Vth for respective ambient temperatures of sensors 16 in step 58.

Thermistors 19 heat, resistance of thermistors 19 changes, and voltages at nodes N2 change. After a predetermined time T, such as 10 seconds, voltage V2 is measured at nodes N2 of sensors 16 in step 60. The multiplexer 22 communicates voltages at nodes N2 of sensors 16 to the control module 24.

The control module 24 compares V2 of sensors 16 to respective Vth for sensors 16. The control module 24 determines in step 62 if V2 is greater than Vth for each one of the sensors 16. If true for one or more of the sensors 16, the control module 24 determines in step 66 that one or more of the sensors 16 is not submersed in fuel. If false for one or more of the sensors 16, the control module 24 determines in step 64 that one or more of the sensors 16 is submersed in fuel.

The control module 24 calculates the fuel level 12 in step 68 based on a number of sensors 16 that are submersed in fuel and their respective location (height) in the fuel tank 14. The control module 24 displays the fuel level 12 in step 70 using an indicator 28. The method 50 ends in step 72.

An accuracy with which the fuel level 12 can be increased by increasing the number of sensors 16 installed in the fuel tank 14. Increasing the number of sensors 16 may also reduce failure rate of the system 10 even if some of the sensors 16 fail over time.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel level sensing system for use in conjunction with a fuel tank, the sensing system comprising:
    a plurality of temperature sensors adapted to be positioned at different heights of an internal fuel tank surface;
    an energy source coupled to inputs of each of the plurality of temperature sensors; and
    a controller coupled to outputs of each of the plurality of temperature sensors, the controller operative to determine an initial temperature of each temperature sensor before each temperature sensor is heated, to energize each sensor with a supply of constant voltage from the energy source for at least a predetermined stabilizing time period, to determine a stabilized temperature of each temperature sensor after the stabilizing time period has elapsed while each sensor is still being energized and heated by said supply of constant voltage, and to determine whether each temperature sensor is immersed in fuel as a function of each sensor's stabilized temperature.

2. The fuel system of claim 1 wherein the controller is further operative to determine fuel level in the fuel tank as a function of each sensor's immersion status.

3. The fuel sensing system of claim 2 further comprising a display coupled to the controller, and wherein the controller is further operative to cause the display to indicate the determined fuel level.

4. The fuel sensing system of claim 1 wherein the plurality of temperature sensors comprise thermistors.

5. The fuel sensing system of claim 4 wherein the controller determines a sensor's initial temperature by reading an initial voltage at the sensor's output.

6. The fuel level sensing system of claim 5 wherein the controller determines a threshold voltage for each sensor as a function of each sensor's initial voltage.

7. The fuel level sensing system of claim 6 wherein the controller determines each sensor's stabilized temperature by reading each sensor's output voltage after the stabilizing time period has elapsed.

8. The fuel level sensing system of claim 7 wherein the controller determines whether each sensor is immersed in fuel by comparing each sensor's output voltage read alter the stabilizing time period has elapsed to each sensor's threshold voltage.

9. The fuel level sensing system of claim 1 wherein the outputs of the plurality of temperature sensors are coupled to the controller via a multiplexer 10. The fuel level sensing system of claim 1 wherein each temperature sensor comprises:
    a fixed resistor having a first terminal coupled to the sensor input; and
    a thermistor having a first terminal coupled to a second terminal of the fixed resistor at a node point and a second terminal coupled to a current sink;
    the node point coupled to the sensor output.

11. A method for sensing fuel level in a fuel tank, comprising:
    positioning a plurality of temperature sensors at different heights of an interior surface of the fuel tank;
    determining an initial temperature of each sensor before each sensor is heated;
    energizing each sensor with an energy source providing a supply of constant voltage for at least a predetermined stabilizing time period;
    determining a stabilized temperature of each sensor after the stabilizing time period has elapsed while each sensor is still being energized and heated by said supply of constant voltage; and
    determining whether each sensor is immersed in fuel as a function of each sensor's stabilized temperature.

12. The method of claim 11 further comprising determining a fuel level in the fuel tank as a function of an immersion status of each sensor.

13. The method of claim 12 further comprising displaying the fuel level determined.

14. The method of claim 11 wherein each sensor comprises a thermistor.

15. The method of claim 14 wherein determining an instant temperature of each sensor is performed by reading an initial voltage at the thermistor's output.

16. The method of claim 15 further comprising determining a threshold voltage for each thermistor as a function of each sensor's initial voltage.

17. The method of claim 16 wherein determining a stabilized temperature of each sensor is performed by reading each sensor's output voltage after the stabilizing time period has elapsed.

18. The method of claim 17 wherein determining whether each sensor is immersed in fuel is performed by comparing each sensor's output voltage after the stabilizing time period has elapsed to each sensor's threshold voltage.

* * * * *